Figure 1:
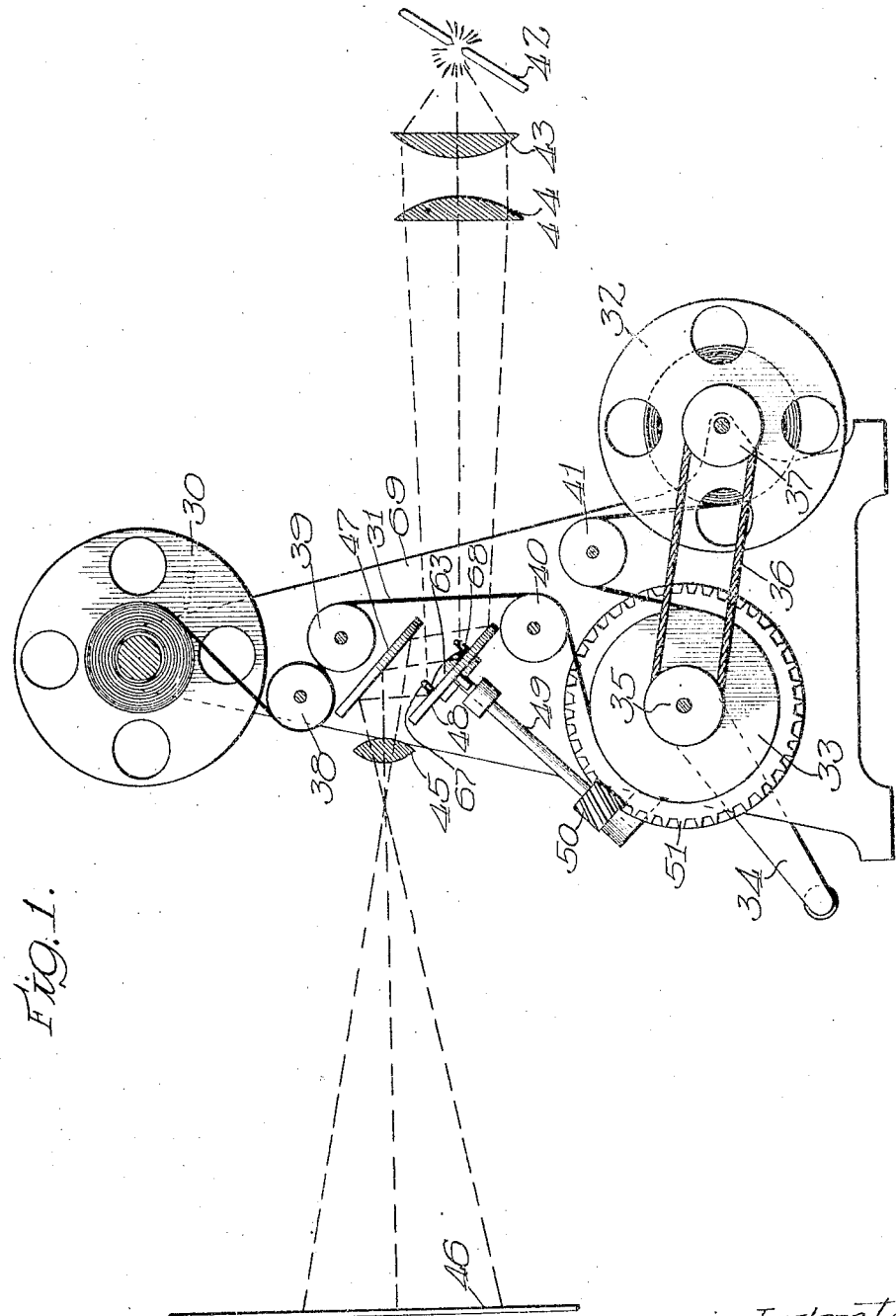

H. B. BYRON.
KINETOGRAPHIC APPARATUS.
APPLICATION FILED FEB. 24, 1912.

1,154,233.

Patented Sept. 21, 1915.
2 SHEETS—SHEET 1.

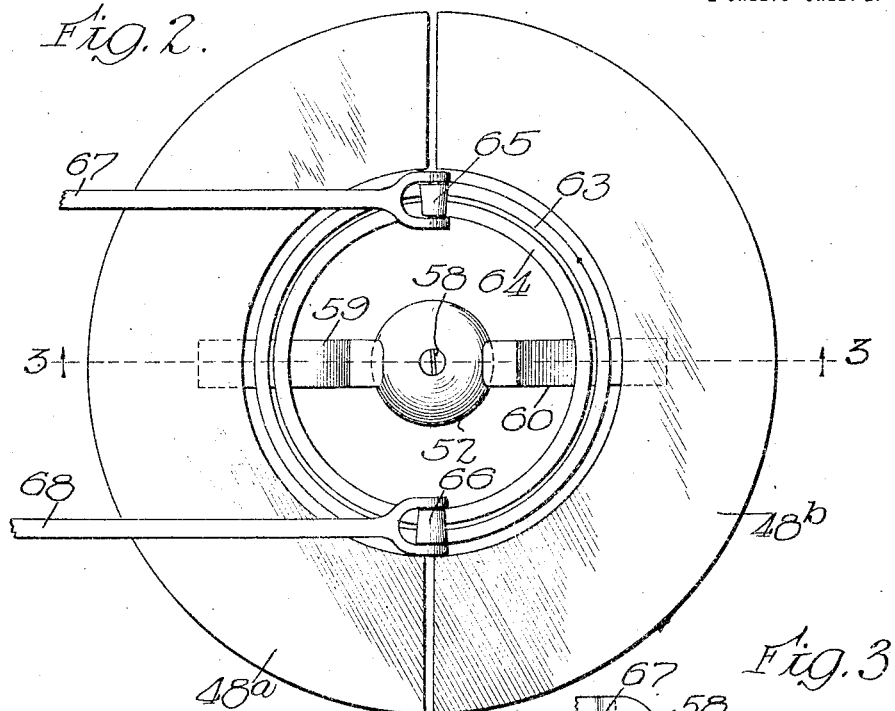
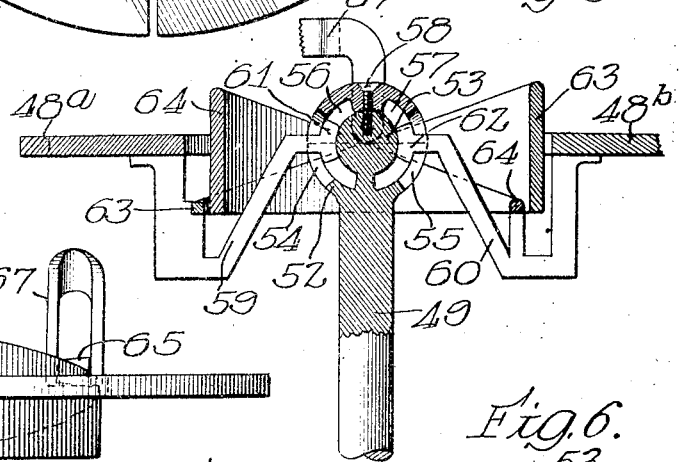
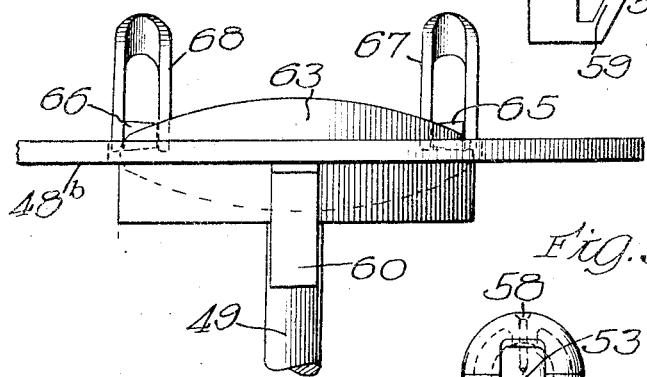
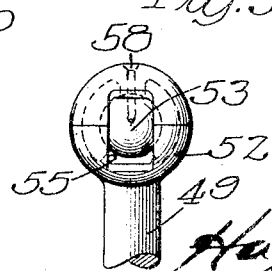
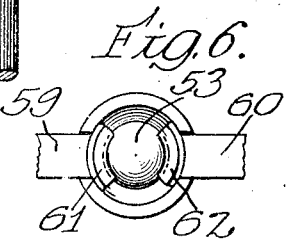

UNITED STATES PATENT OFFICE.

HAGAR BOLTON BYRON, OF CHICAGO, ILLINOIS, ASSIGNOR, BY MESNE ASSIGNMENTS, OF ONE-THIRD TO A. H. ADAMS, ADA E. PICKARD, AND J. L. JACKSON, OF CHICAGO, ILLINOIS.

KINETOGRAPHIC APPARATUS.

1,154,233.        Specification of Letters Patent.        Patented Sept. 21, 1915.

Application filed February 24, 1912. Serial No. 679,622.

*To all whom it may concern:*

Be it known that I, HAGAR BOLTON BYRON, a citizen of the United States, residing at Chicago, in the county of Cook and State of Illinois, have invented certain new and useful Improvements in Kinetographic Apparatus, of which the following is a specification, reference being had to the accompanying drawings.

My invention relates to the reproduction of views kinetographically, and has for its object to provide new and improved apparatus, by which the pictures projected on the screen will be stationary, or substantially so, and by which the intensity of the light by which the image is projected will be practically constant at all times.

According to the present practice where a revolving shutter is employed, the light is intermittent and consequently the illumination of the screen is reduced about fifty per cent. from what it would be if the illumination were constant, an objection which is avoided by my present invention.

My invention accomplishes the object by neutralizing the movement of the moving picture-film before the image is projected on the screen. In the apparatus shown and described this is effected by compensating for the movement of the film by interposing between the source of light and the screen a system of mirrors, one of which is arranged to oscillate or rock so as to neutralize or arrest the movement of the image and reflect it to a fixed point on a stationary mirror which reflects it to the screen, but my invention, generically considered, is not limited to the form shown, as other means may be employed.

In the drawings, Figure 1 is a side view, partly diagrammatic, illustrating my improved apparatus; Fig. 2 is a plan view of the first or primary mirrors used in the form of apparatus shown in Fig. 1; Fig. 3 is a sectional view on line 3—3 of Fig. 2, some parts being broken away; Fig. 4 is an edge view of the apparatus shown in Fig. 2; Fig. 5 is a detail illustrating the bearing for the primary mirrors in elevation; and Fig. 6 is a plan view of the bearing and connecting parts, the cap being removed.

Referring to the drawings 30 indicates a reel which carries the film 31, and 32 indicates a rewinding reel.

33 indicates a rotary friction drum operated by a crank 34 for moving the film, said drum having a pulley 35 connected by a belt 36 with a pulley 37 on the rewinding reel 32.

38—39—40—41 indicate guide-pulleys for the film.

42 indicates the source of light, 43—44 condensing lenses interposed between the source of light and the film 31, 45 the focusing lens, and 46 the screen.

47 indicates a stationary mirror, which reflects the image upon the focusing lens 45.

48 indicates a rotary rocking mirror, which is mounted at the upper end of an inclined shaft 49 having a worm 50 which meshes with a worm-wheel 51 forming a part of the drum 33, so that the rotation of the drum 33 causes the shaft 49 and mirror 48 to rotate.

The construction of the mirror 48 and the operating mechanism therefor is best shown in Figs. 2, 3 and 4. As therein shown, said mirror is composed of two semi-circular mirrors $48^a$—$48^b$, which, together, form the circular mirror 48. The mirror or mirror members $48^a$—$48^b$ are mounted upon the shaft 49 so that they not only rotate with said shaft but also rock about a transverse axis so as to change their angular relation to each other. In order to provide for this movement, the shaft 49 is provided at its upper end with a spherical head 52 having within it a ball 53, as best shown in Fig. 3. The head 52 is provided with slots 54—55 at opposite sides thereof and segmental chambers 56—57 provided between the head 52 and the ball 53. Preferably, the upper portion of the head 52 is made removable, as shown in Fig. 5, and is held in place by a screw 58. The mirror sections $48^a$—$48^b$ are connected with the shaft 49 by arms 59—60 which project from the rear faces of the mirror sections and pass through the slots 54—55 into the chambers 56—57, where they are provided with heads 61—62 which bear upon the ball 53 and thereby form bearing blocks for the mirror sections and at the same time prevent the withdrawal of the arms 59—60 from the head 52. It will be apparent that by this construction the rotation of the shaft 49 will cause the mirror sections to rotate with the shaft and that the mirror sections will at the same time be capable of swinging about a transverse axis to change their angular relation to each other. In order to oscillate the mirror sections $48^a$—$48^b$, said sections are connected, respectively, to cylindrical cams 63—64 the operating margins of which are inclined, as shown in Figs. 3 and 4. Said cams are rigidly connected to their respective mirror sections so that they rotate with them.

65—66 indicate a pair of rollers mounted on fixed supports 67—68 secured in position in any suitable way, as by connecting them to the standards 69 which support the other parts of the apparatus, as shown in Fig. 1, but said rollers may be fixedly supported in any other suitable way. The rollers 65—66 are arranged to bear upon the upper margins of the cams 63—64 so that when the cams are rotated by the rotation of the shaft 49 they will act to rock said cams and consequently rock the mirror sections attached to them, the roller 65 acting to rock the mirrors in one direction and the roller 66 to rock them in the opposite direction as the cams rotate. For example, when the highest part of the cam 63 is under roller 65, the mirror 48ª with which said cam is connected will be tipped in one direction, whereas when the highest part of said cam is under roller 66, said mirror will be tipped in the opposite direction. This movement, of course, takes place gradually and continuously, as each cam is always in contact with both rollers. When the parts are in the position shown in Figs. 2 and 3, the rollers 65 occupy a neutral position, as shown in dotted lines in said figures, so that the mirror sections 48ª—48ᵇ are then parallel. When the shaft 49 rotates to carry the cams 63—64 from the position shown in said figures, however, the rollers 65—66 will act to thrust back the projecting edges of the cams and consequently rock their respective mirror sections so as to cause them to assume an inclined or angular position with relation to each other, the faces of the mirrors then assuming a more or less acute angle to the axis of the shaft 49. This angle varies constantly as the shaft rotates, from a position perpendicular to the axis of the shaft to an angle determined by the elevation of the cams. In the construction shown this angle is one of about thirty degrees, but the range of movement of the mirrors may be altered to meet the necessities of any given situation.

The operation of the apparatus is as follows: The mirror 48, composed of the mirror sections described, rotates continuously as the film travels, so that the beam of light projected upon said mirror, which is the primary mirror, when reflected on the secondary mirror is diverted sufficiently to compensate for the movement of the picture, so that the images are received by the secondary mirror at a fixed point notwithstanding the movement of the picture, and are consequently projected as a stationary image on the screen. By causing the sections of the primary mirror to rock or oscillate coincidentally with their rotary movement, such mirror presents to the light a constantly changing series of angles which act to neutralize the movement of the picture and thus reflect a stationary image upon the secondary mirror. By the use of the two mirror sections moving in the manner described, as soon as one of said sections passes out of action, the other section takes up the next image, and thus the two act consecutively upon adjacent images, and the action is thereby made constant, or without any appreciable interruption.

That which I claim as my invention, and desire to secure by Letters Patent, is,—

1. A kinetographic apparatus, comprising means for moving a picture film, means for directing light through such film, a rotating mirror comprising a plurality of rocking members, a shaft having a spherical bearing member, means connected with said rocking members and bearing against said bearing member, and means for rocking said rocking members as said shaft rotates.

2. A kinetographic apparatus, comprising means for moving a picture film, means for directing light through such film, a rotating mirror comprising a plurality of rocking members, a shaft having a spherical bearing member, means connected with said rocking members and bearing against said bearing member, and cam mechanism for rocking said rocking members as said shaft rotates.

3. A kinetographic apparatus, comprising means for moving a picture film, means for directing light through such film, a rotating mirror comprising a plurality of rocking members, a shaft having a spherical bearing member, means connecting with said rocking members and bearing against said bearing member, cylindrical cams connected with said rocking members and rotating therewith, and means coacting with said cams for rocking said rocking members as the shaft rotates.

4. A kinetographic apparatus, comprising means for moving a picture film, means for directing light through such film, a rotating mirror comprising a plurality of rocking members, a shaft having a slotted spherical head and a ball within said head, means connected with said rocking members and bearing against said ball, and means for rocking said rocking members as said shaft rotates.

5. A kinetographic apparatus, comprising means for moving a picture film, means for directing light through such film, a rotating mirror comprising a plurality of rocking members, a shaft having a slotted spherical head and a ball within said head, means connected with said rocking members and bearing against said ball, cylindrical cams connected with said rocking members and rotating therewith, and means coacting with said cylindrical cams for rocking said rocking members.

6. A kinetographic apparatus, comprising means for moving a picture film, means for directing light through such film, a rotating mirror comprising a plurality of rocking members, cylindrical cams connected with said rocking members and rotating therewith, and means coacting with said cams for rocking said rocking members as the mirror rotates.

7. A kinetographic apparatus, comprising means for moving a picture film, means for directing light through such film, a rotating mirror comprising a plurality of rocking members, a shaft, means connecting said rocking members with said shaft so that they rotate therewith, cylindrical cams connected with said rocking members and rotating therewith, and means coacting with said cams for rocking said rocking members as the shaft rotates.

HAGAR BOLTON BYRON.

Witnesses:
W. H. DeBusk,
W. A. Furnner.